April 19, 1966 A. E. ANDERSON ETAL 3,246,532
TORQUE SENSITIVE CLAMPING MEANS FOR A FRICTION DRIVE TRANSMISSION
Filed Feb. 21, 1963
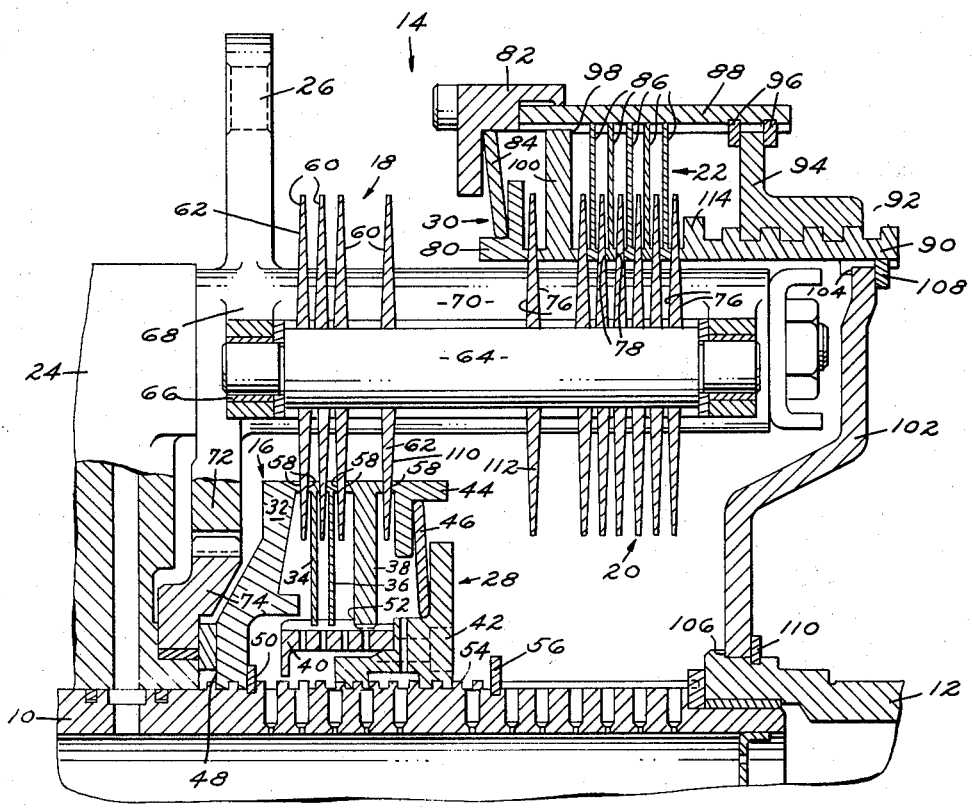
ARNOLD E. ANDERSON
WALTER K. HEINTZ
INVENTORS
BY John R. Faulkner
Robert E. McCollum
ATTORNEYS

United States Patent Office 3,246,532
Patented Apr. 19, 1966

3,246,532
TORQUE SENSITIVE CLAMPING MEANS FOR A FRICTION DRIVE TRANSMISSION
Arnold E. Anderson, Livonia, Mich., and Walter K. Heintz, Westfield, N.J., assignors to Ford Motor Company, Dearborn, Mich., a corporation of Delaware
Filed Feb. 21, 1963, Ser. No. 260,274
12 Claims. (Cl. 74—200)

This invention relates to a transmission, and more particularly to a friction disc transmission having torque sensitive means for modulating the forces clamping the drive and driven discs together.

In many power transmission applications, such as the automobile transmission, for example, input torque and speed are widely variant, and at times the torque is even reversed, such as during engine braking. In prior known friction disc drives using a substantially constant clamping force to drivingly engage the discs, considerable wear of the parts and loss of efficiency results because of the changing direction of torque flow and the widely varying levels of torque transmitted. Also, generally, there is no distinction made in the clamping forces for the different loads on the different stages, i.e., between the torque transmitted from the input shaft as compared to that transmitted to the output shaft.

This invention provides a friction disc transmission of the type described that provides maximum overall efficiencies and extension of the wear life of the parts by properly modulating the disc clamping forces at all times so as always to be the correct value for the specific torque transmitted at any particular time. This is done not only for one stage, but for each of the input and output stages, i.e., where the loads may be different.

The invention therefore provides automatic modulation of the disc clamping forces in either direction in accordance with the degree of torque to be transmitted. This is accomplished by means of a simple mechanical device occupying a relatively small space in the transmission. It enables a minimizing of the number of hydraulic elements to be used in the transmission and also lessens the lubrication problems. It also permits push starts in the transmission and engine braking.

Therefore, it is a primary object of the invention to provide a friction disc drive that is simple in construction, high in operating efficiency, easy to assembly and disassemble, and one that provides a long wear life of its parts.

It is another object of the invention to provide a simple device in a friction disc type of transmission for modulating the disc clamping forces in proportion to the torque to be transmitted.

A further object of the invention is to provide torque sensitive means to modulate the disc clamping forces in a friction drive having interdigited driving and driven discs.

A still further object of the invention is to provide a simple mechanical torque sensitive device for a transmission of the type described that produces varying levels of disc clamping forces to provide a maximum operational efficiency and maximum wear life of the parts regardless of the direction and amount of torque transmitted by or to the power input or output shafts.

It is a still further object of the invention to provide a friction disc transmission providing a modulation of the disc clamping forces in accordance with changes in the torque transmitted by means of a simple device that occupies a relatively small space, operates efficiently, is automatic in operation, enables push starts and engine braking to be established, and is adaptable to existing constructions.

Another object of the invention is to provide a friction disc transmission having a number of independently operating torque sensitive devices to automatically modulate the disc clamping forces, the devices being axially movable along helical splines in response to torque differentials between driving and driven parts to provide the sole disc clamping forces at higher torque transmitting levels, and cooperating with spring biasing means to provide the required clamping forces at low or reversed torques.

Other objects, features and advantages of the invention will become apparent upon reference to the succeeding, detailed description thereof, and to the drawing illustrating the preferred embodiment thereof, wherein the figure illustrates schematically, in a partial cross-sectional view, a transmission embodying the invention.

The figure shows, in general, a power input shaft 10 drivingly connected to a power output shaft 12 by a friction disc type transmission 14. The transmission has a set of inner friction discs 16 in interdigital engagement with a first set of intermediate discs 18, a second set of discs 20 being engaged with a set of outer friction discs 22. The discs 22 have a splined connection to the output shaft 12. The intermediate discs 18 and 20 are rotatably supported on a relatively stationary axis secured in a portion of the transmission housing 24; the disc axis can be adjusted radially, however, by a positioning arm 26 to effect a change in the drive ratio through the transmission.

The intermediate discs 18 and 20 are clamped against the inner and outer disc sets by two independently operating torque sensitive devices 28 and 30 providing clamping forces that vary in proportion to torque to be transmitted from or to the power input and output shafts, as will be described in more detail later. Suffice it to say at this point, that the rotation of discs 16 in one direction rotates discs 18 and 20 in the opposite direction about their stationary axis to drive the discs 22 and output shaft in a direction opposite to that of the input shaft at speeds varying from a reduction to an overdrive, as determined by the radial position of the planet discs. The speed variation, of course, also depends upon the selection of the diameters of the different discs. The torque sensitive devices 28 and 30 are helically splined to the power input and output shafts to provide axial disc clamping forces proportional to the torque to be transmitted.

More specifically, input shaft 10, which may be driven by any suitable source of power, such as, for example, the internal combustion engine for a motor vehicle, is drivingly connected by straight splines to an annular friction disc member 32 constituting an end element of the disc set 16. The set includes three intermediate annular disc members 34, 36 and 38 each slidably connected by straight splines to an extension 40 of a disc carrier 42. The carrier also floatingly supports an end friction disc 44 on a Belleville spring 46. The disc 32 is fixed against axial movement between a shoulder 48 on the input shaft 10 and a snap ring 50. The intermediate discs are adapted to slide axially on their splines, the disc 38 at times seating against a step 52 in the carrier extension spline for a purpose to be described later. The disc carrier 42 is connected to the input shaft by an internal helical spline 54 so as to slide substantially axially between a stop ring 56 and snap ring 50 in response to a torque differential between the input shaft and carrier to clamp the sets 16 and 18 together.

The discs of the inner set 16 each have lateral rim surfaces 58 of a conical profile engaging an opposite mating lateral friction surface 60 on spaced annular planet friction discs 62. The discs 62 are slidably but nonrotatably secured on one end of a shaft 64 rotatably mounted on bearings 66 in one portion 68 of the shaft axis adjusting arm 26.

The adjusting arm is essentially a right angle bellcrank lever having a sleeve hub 70 rotatable about a stationary shaft (not shown) extending cantilever-like from the transmission housing 24. The details of construction and support of the lever are known and may be similar to those shown in United States Patent Number 3,099,927, "Infinitely Variable Transmission," issued August 6, 1963, Arnold E. Anderson, a repetition of which is therefore believed to be unnecessary. As stated, the one leg portion 68 of the lever rotatably supports the shaft 64. The other leg portion constitutes the actuating arm 26, which when rotated in either direction by any suitable means, such as a fluid pressure servo, for example, causes the lever to pivot about the stationary shaft and radially swing the shaft 64.

As shown, the sleeve 70 is formed with a gear segment 72 extending radially towards the input shaft and meshing with an annular gear 74 rotatably mounted on the shaft for properly centering and guiding the movement of the sleeve. Thus, the intermediate discs 62 can be moved radially inwardly or outwardly to change the radial distance from their axis to the points of contact with the rim portions of the discs of inner set 16. The drive ratio is therefore varied due to the change in speed of the shaft 64.

The opposite end of shaft 64 has the second stage of annular friction discs 20 nonrotatably but slidably splined thereon. These discs, like discs 62, have opposite conical lateral surfaces 76 engaged by the mating rim portions 78 of the series of spaced annular outer friction discs 22. These latter discs are constructed and supported in a manner similar to that of the inner disc set 16. That is, the outer disc set includes an end stage 80 floatingly supported from an annular disc carrier 82 on a Belleville spring 84, six intermediate annular discs 86 each being connected by a straight spline to a drum-like extension 88 of the carrier 82, and another end disc 90 connected by a helical spline 92 to a ring flange 94. The ring flange has a straight splined connection to the carrier extension and is fixed against axial movement by snap rings 96. Like disc carrier extension 40, disc carrier extension 88 includes a step 98 in its spline against which the intermediate disc 100 is seated at times. With this construction, therefore, relative rotation between the ring flange 94 and end ring disc 90, induced by a torque differential between the members, causes the carrier to move axially in either direction to clamp the interdigited planet and ring discs together with variable forces depending upon the direction and amount of torque to be transmitted. The end disc 90 is connected to the output shaft 12 by a radially depending member 102 axially positioned between shoulders 104, 106 and snap rings 108, 110 on the disc portion and output shaft, respectively.

In operation, with shafts 10 and 12 stationary, the parts are in the positions shown in the figures. The springs 46 and 84 exert a preload of the end discs 44 and 80 against the end intermediate discs 110 and 112 by seating the discs 38 and 100 against the steps 52 and 98 in the splines of the carrier extensions 40 and 88 to form closed spring force transmitting circuits. The discs 38 and 100 therefore act as reaction members initially, under zero torque load conditions as well as during light torque loads, to always maintain the transmission conditioned for a drive. That is, the inner disc 44 spring loads intermediate disc 110 against inner disc 38, and outer disc 80 spring loads intermediate disc 112 against outer disc 100 to transmit torque through the transmission. The remaining discs are unloaded at this time.

Therefore, upon rotation of shaft 10 imparting a high starting torque to both disc 32 and disc carrier 42, the initial torque and speed differential between input shaft 10 and disc carrier 42 causes the carrier to move along the helical spline to the left to provide an axial thrust force clamping the disc sets 16 and 18 together. Relative angular movement between the discs 34, 36, 38 on the carrier and end disc 32 due to the straight spline connection of disc 32 to input shaft 10 as compared to the helical spline connection of carrier 42 to input shaft 10, is absorbed between the disc 32 and the adjacent intermediate discs. This results in a viscous damping to control the rate of load increase. When the axial thrust load exceeds the spring preload, disc 38 unseats from the carrier spline step 52, and all the discs of sets 16 and 18 become uniformly loaded. As the thrust load increases to a maximum, which is substantially instantaneous under high torque starting conditions, the spring flattens until the lateral rim of the spring bears directly against the face of the disc carrier, thus limiting the spring stress.

The discs of set 18 are now rotating, their speed being determined by the radial distance from the axis of shaft 64 to their points of contact with the rims of the discs of sets 16. The drive of the disc set 18 is therefore transmitted along the planet shaft 64 to the second set of discs 20 causing rotation of the set of outer discs 22. The torque differential between the input end and intermediate discs 80 and 86, and thus carrier 82 and ring flange 94, relative to disc 90 and output shaft 12, therefore causes an axial movement of ring flange 94 and carrier 82 on the helical spline to the right to flatten spring 84 against the carrier, unseat disc 100 from step 98, and uniformly load the outer discs 22 with a clamping force proportional to the torque to be transmitted. As in connection with the inner discs, the slight angular rotation of the discs 86 and end disc 80 relative to the opposite end disc 90, due to the movement of the carrier and discs along the helical spline, is absorbed between the end and other discs resulting in a viscous damping. Thus, a drive is transmitted between the input and output shafts. Also, as in connection with the inner disc set 16, at zero or light torque loads, only the discs 80, 112, and 100 are loaded since the light torque load is unable to overcome the force of spring 84 and move the carrier 82 to the right. Thus, disc 100 remains against the reaction steps 98. Since the contact rim of end discs 90 does not move axially, the five adjacent intermediate discs 86 remain unloaded at this zero or light torque condition.

As the amount of torque transmitted from the discs of set 16 to the discs 60 increases, the torque load decreases, thereby causing a backing off to the right of the inner disc carrier 42 along the helical spline 54 to reduce the disc clamping forces in proportion to this decrease in torque differential. This same action, only to the left, occurs in connection with the outer disc carrier 82. Thus, the clamping forces are progressively reduced until the inner disc 38 and outer disc 100 again seat against the steps 52 and 98, not necessarily simultaneously, however, to reduce the clamping forces to that provided only by the preload of springs 46 and 84. At very light torque loads, therefore, only the end discs 110 and 112 of the intermediate sets 18 and 20 are loaded to transmit the torque load between the power shafts.

These same inner and outer end discs 44 and 80 carry the torque load upon a reversal in torque, such as during coasting, or for providing engine braking or a push start, when the output shaft 12 becomes the driver. In this case, the output shaft connected disc 90 rotates ahead of the ring flange 94 and discs 86 and 80 and carrier 82 to back the carrier axially to the left along spline 92 until the ring flange 94 abuts stop 114 which is the light torque load position. The clamping force at this time, therefore, is that provided solely by the preload of spring 84 against disc 112. Simultaneously, the drive of inner disc carrier 42 by the disc 110 causes the carrier to move along the helical spline to the right to abut stop 56, at which point, the clamping force is that provided solely by the preload spring 46. Thus, at this time, the intermediate and end outer discs 86 and 90, and intermediate and end inner discs 36, 34 and 32 are unloaded, the torque being transmitted entirely by engaged outer discs 80 and 100 and disc 112, and disc 110 and inner discs 44 and 38.

If a change in speed ratio is desired, the positioning arm 26 is rotated to radially move the shaft 64 and therefore the two sets of discs 18 and 20. A radially inward movement increases the speed to the output shaft due to the decrease in the distance between the inner discs and axis of shaft 64 and increase in distance from the axis to the outer discs. That is, the speed of the axis of shaft 64 increases, increasing the peripheral velocity of the points of contact of the discs 20 with the outer discs. The outer disc contacts, however, are at a greater radius from the axis of shaft 64 than before, and, therefore, have an even greater peripheral velocity.

Conversely, a decrease in speed of the output shaft 12 with respect to that of input shaft 10 can be accomplished by moving arm 26 to move the shaft 64 radially outwardly, thereby decreasing the speed of the shaft 64 and reducing the speed of the outer discs.

From the foregoing, therefore, it will be seen that the invention provides a friction disc transmission having simple mechanical torque sensitive means for automatically modulating the disc clamping forces in proportion to the amount of torque transmitted, thus providing a maximum efficiency of operation and reducing wear of the parts.

While the invention has been shown in the drawing in its preferred embodiment, it will be clear to those skilled in the arts to which the invention pertains that many changes and modifications may be made thereto without departing from the scope of the invention.

We claim:

1. A friction disc driving mechanism including, in combination, a plurality of spaced rotatable driving discs, a plurality of spaced rotatable driven discs engaged by said driving discs in interdigital relationship, and means for clamping said driving and driven discs together, said means including first means initially clamping one portion of said interdigited discs together, and second means coacting with said first means and subsequently clamping all the said interdigited discs together with forces varying in proportion to the changes in the torque to be transmitted by said discs.

2. A friction disc driving mechanism including, in combination, an input shaft, an output shaft, and friction drive means connecting said shafts for a plurality of drives therebetween, said means including a plurality of spaced rotatable driving discs connected to said input shaft, a plurality of spaced rotatable driven discs engaged by said driving discs in interdigital relationship and operatively connected to said output shaft, and means for clamping said driving and driven discs together, said means including first means initially clamping one portion of said interdigited discs together, and second means coacting with said first means and subsequently clamping all the said interdigited discs together with forces varying in proportion to the changes in the torque to be transmitted by said discs.

3. A friction disc drive mechanism as in claim 2 wherein said second means comprises torque sensitive means driving a portion of said discs and connected to said input shaft by a helical spline effecting an axial movement of said torque sensitive means into a disc clamping position upon application of torque thereto and to said discs from said drive means.

4. A driving mechanism as in claim 3 wherein said first means comprises spring biasing means urging said one portion of said discs together to transmit torque therebetween.

5. A driving mechanism as in claim 4 wherein said spring means is effective at low torque differentials between said discs to provide a drive between said one portion of discs, said torque sensitive means overcoming the force of said spring means above predetermined greater torque differentials between said discs to clamp all of said discs together.

6. A friction disc drive mechanism comprising, input and output shafts, and means between said shafts for transmitting torque therebetween, said means including a plurality of annular intermediate friction discs in interdigital engaging relationships with pluralities of inner and outer discs, portions of said inner and outer discs being fixedly connected respectively to said input and output shafts, and a pair of axially slidable torque sensitive devices helically splined one to said input shaft and the other to said output shaft, said devices including carriers slidably supporting other portions of said inner and outer discs respectively, said carriers being movable axially in response to a differential in torque to be transmitted by said discs to clamp said interdigited discs together with forces varying in proportion to the torque transmitted, spring means between said carriers and the respective inner and outer discs associated therewith biasing said discs into driving engagement with said intermediate discs at low levels of torque differentials between said discs, and spring force reaction means on said carriers, the axial movement of said carriers to clamp said inner and outer discs to said intermediate discs in response to the attainment of predetermined torque differentials between said discs rendering said spring and reaction means ineffective.

7. A friction disc driving mechanism including, in combination, a plurality of spaced rotatable driving discs, a plurality of spaced rotatable driven discs engaged by said driving discs in interdigital relationship, and clamping means for clamping said driving and driven discs together, said clamping means including means operable below a predetermined level of the torque to be transmitted between said discs for clamping a portion of said interdigited discs together, and torque responsive means operable above said level of torque for clamping all of said interdigited discs together.

8. A friction disc driving mechanism including, in combination, a plurality of spaced rotatable driving discs, a plurality of spaced rotatable driven discs engaged by said driving discs in interdigital relationship, and clamping means for clamping said driving and driven discs together, said clamping means including torque responsive means operable upon application of torque to said discs in one direction for loading all of said interdigited discs together, said clamping means also including means operable upon a reversal in the direction of application of torque for loading one portion of said interdigited discs together and unloading the remaining of said interdigited discs.

9. A friction disc driving mechanism comprising, a rotatable shaft, a rotatable member, torque sensitive means operatively connecting said member and shaft for effecting an axial movement therebetween in response to a differential level of torque application to said member and shaft, a first plurality of spaced rotatable discs connected to said member for an axial movement between said member and discs, a second plurality of spaced rotatable discs engaged by said first discs in interdigited relationship, and spring means between said member and first discs for transmitting axial movement in one direction of said member to said first discs to clamp said interdigited discs together with forces varying in proportion to the level of the torque differential between said member and shaft, said member having means thereon together with said spring means and one portion of said first discs forming at times a closed spring force transmitting circuit to load a portion of said interdigited discs together to provide a drive therebetween while unloading the remaining interdigited discs.

10. A friction disc driving mechanism comprising, a rotatable shaft, a rotatable member, torque sensitive means operatively connecting said shaft member and shaft for effecting an axial movement therebetween in response to a differential level of torque application to said member and shaft, a first plurality of spaced rotatable discs connected to said member for an axial movement between said member and discs, a second plurality of spaced rotatable discs engaged by said first discs in interdigited relationship, and spring means between said member and first discs for transmitting axial movement in one direction of said member to said first discs to clamp said interdigited discs together with forces varying in proportion to the level of the torque differential between said member and shaft, said member having means thereon together with said spring means and one portion of said first discs forming at times a closed spring force transmitting circuit to load a portion of said interdigited discs together to provide a drive therebetween while unloading the remaining interdigited discs, movement at times of said member in one axial direction relative to said first discs completely loading all of said discs together.

11. A friction disc driving mechanism comprising, a rotatable shaft, a rotatable member, torque sensitive means operatively connecting said member and shaft for effecting an axial movement therebetween in response to a differential level of torque application to said member and shaft, a first plurality of spaced rotatable discs connected to said member for an axial movement between said member and discs, a second plurality of spaced rotatable discs engaged by said first discs in interdigited relationship, and spring means between said member and first discs for transmitting axial movement in one direction of said member to said first discs to clamp said interdigited discs together with forces varying in proportion to the level of the torque differential between said member and shaft, said member having force reaction means in the path of movement of some of said first discs for stopping at times axial movement of said last named first discs and the second discs interdigited therewith at times to clamp said latter first discs and interdigited second discs to provide a drive therebetween, the remaining of said discs being unloaded.

12. A friction disc driving mechanism comprising, a rotatable shaft, a rotable member, torque sensitive means operatively connecting said member and shaft for effecting an axial movement therebetween in response to a differential level of torque application to said member and shaft, a first plurality of spaced rotatable discs connected to said member for an axial movement between said member and discs, a second plurality of spaced rotatable discs engaged by said first discs in interdigited relationship, and spring means between said member and first discs for transmitting axial movement in one direction of said member to said first discs to clamp said interdigited discs together with forces varying in proportion to the level of the torque differential between said member and shaft, said member having force reaction means in the path of movement of some of said first discs for stopping at times axial movement of said last named first discs and the second discs interdigited therewith at times to clamp said latter first discs and interdigited second discs to provide a drive therebetween, the remaining of said discs being unloaded, said reaction means being movable upon subsequent movement of said member in one axial direction relative to said first discs to effect a loading of all of said discs together.

References Cited by the Examiner

UNITED STATES PATENTS

| | | | |
|---|---|---|---|
| 929,405 | 7/1909 | Dill | 74—199 |
| 948,091 | 2/1910 | Geer | 74—199 |
| 2,721,639 | 10/1955 | Miller | 192—54 |
| 2,841,019 | 7/1958 | Beir | 74—199 |

FOREIGN PATENTS

| | | |
|---|---|---|
| 355,061 | 8/1931 | Great Britain. |
| 550,261 | 12/1942 | Great Britain. |

DAVID WILLIAMOWSKY, *Primary Examiner.*

DON A. WAITE, *Examiner.*

T. C. PERRY, *Assistant Examiner.*